July 15, 1952 J. B. ARMITAGE ET AL 2,603,321
MACHINE TOOL CONTROL MECHANISM
Filed April 30, 1947 4 Sheets-Sheet 1

INVENTORS.
Joseph B. Armitage,
James N. Flannery
BY John B. Lukey
W. D. O'Connor
Attorney INVENTORS
Joseph B. Armitage
James N. Flannery
BY John B. Lukey W. D. O'Connor
Attorney

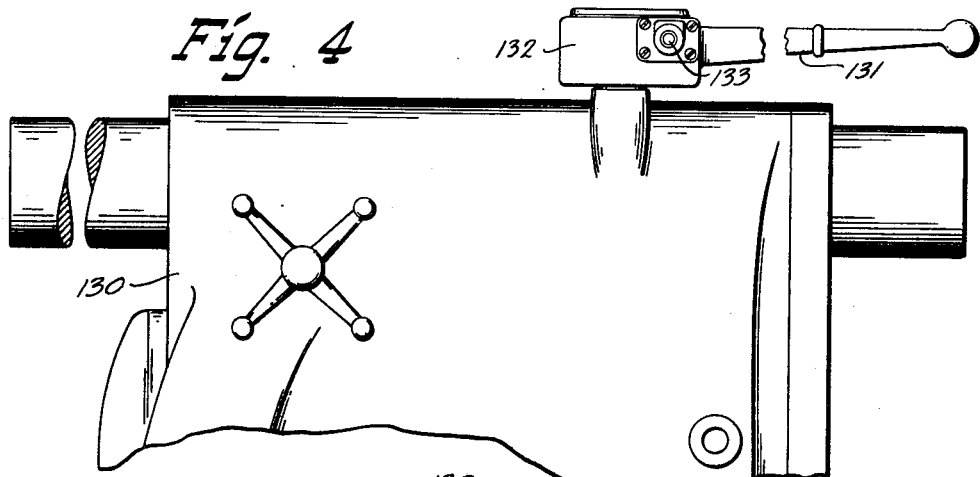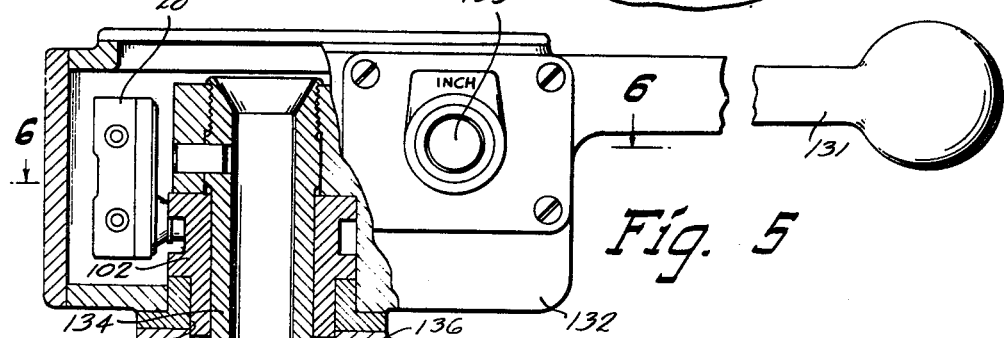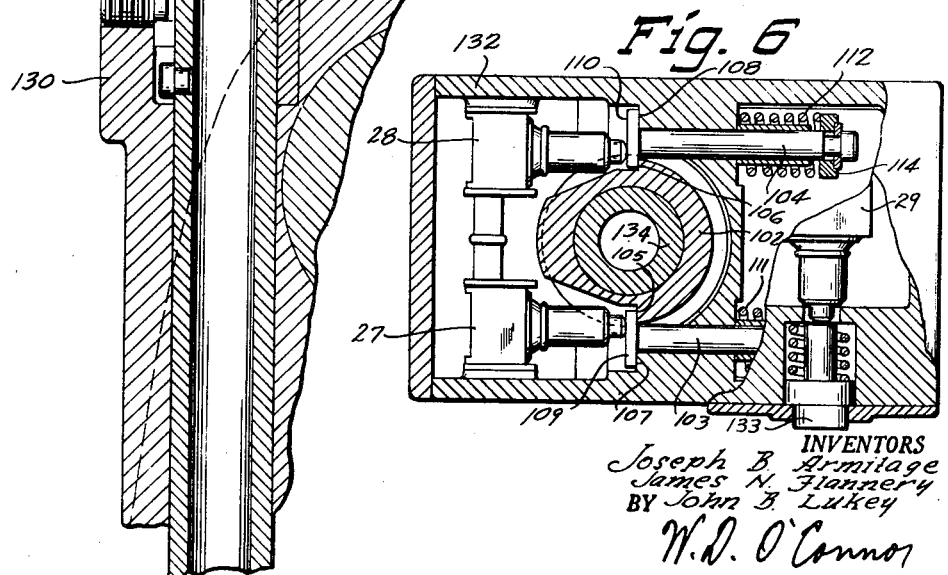

July 15, 1952 — J. B. ARMITAGE ET AL — 2,603,321

MACHINE TOOL CONTROL MECHANISM

Filed April 30, 1947 — 4 Sheets-Sheet 4

INVENTORS
Joseph B Armitage
James N Flannery
BY John B Lukey

W. D. O'Connor
Attorney

Patented July 15, 1952

2,603,321

UNITED STATES PATENT OFFICE 2,603,321

MACHINE TOOL CONTROL MECHANISM

Joseph B. Armitage, Wauwatosa, James N. Flannery, West Allis, and John B. Lukey, Milwaukee, Wis., assignors to Kearney & Trecker Corporation, West Allis, Wis., a corporation of Wisconsin Application April 30, 1947, Serial No. 745,078

18 Claims. (Cl. 192—2)

This invention relates, generally, to improvements in machine tools and more particularly to an improved controlling mechanism for the main drive motor of a milling machine.

A general object of the invention is to provide an improved controlling arrangement for a machine tool drive motor.

Another object of the invention is to provide an improved angularly adjustable machine tool starting lever disposed for selective actuation of a plurality of separate switching means whereby a machine tool power source may be effectively controlled.

Another object of the invention is to provide an improved electrical controlling mechanism for a machine tool motor, that is selectively responsive to mechanical actuating means directly operable by a single manually movable controlling lever.

Another object is to provide an improved manually operable machine tool starting lever arranged for pivotal and angularly adjustable mounting on a machine tool, whereby centrally located switching means may be actuated to selectively control a machine tool motor.

Another object is to provide an improved centralized mounting arrangement for a plurality of motor controlling electric switching means for a machine tool.

Another object is to provide improved resilient means for returning a pivotally movable machine tool starting lever to a predetermined neutral position as well as for limiting the pivotal movement of the lever.

Another object is to provide a single manually operable starting lever arranged for individual selective actuation of any of a plurality of electric circuit control means.

According to this invention, a machine tool, for instance a milling machine, is provided with a single lever control, operative on a plurality of switching means to selectively energize the electric motor of the machine. The control lever is pivotally mounted for angular adjustment on the machine column and is manually movable through a limited arc of operating movement from a resiliently maintained neutral position located midway between its extreme limits of movement. Moving the control lever in one direction from its neutral position causes the machine motor to be energized for normal continuous operation. Moving the control lever in the opposite direction serves the dual purpose of first de-energizing the motor for normal stopping, and secondly, upon further movement, applying an electrical braking action to stop the motor instantaneously for quick stopping. With the control circuit energized, and while the machine motors are not operating, a push button on the control lever may be operated to start the motor momentarily for facilitating transmission adjustment, a time limiting relay being provided for preventing excess speed.

The particular controlling mechanism shown in the drawings by way of illustration, is adapted for a simplified single lever control of a plurality of electric switching means, thus providing an adjustably positionable, manually operable lever for selectively energizing the electric motor or motors of a milling machine. This mechanism is particularly appropriate for embodiment in any of various machine tool structures, such as milling machines, lathes or other generally similar machines in which it may be desired to electrically control the driving motors through manipulation of a single control lever easily accessible from a number of operating positions.

The foregoing and other objects of this invention, which will become more fully apparent from the following detailed specification, may be achieved by the particular apparatus constituting exemplifying embodiments of the invention that is illustrated in and described in connection with the accompanying drawings, in which:

Fig. 4 is a fragmentary view in side elevation of the upper part of a milling machine of the horizontal spindle type, equipped with controlling mechanism embodying a modified form of the invention;

Fig. 5 is an enlarged view partly in vertical longitudinal section through the control mechanism shown in Fig. 4;

Fig. 6 is a view in horizontal transverse section through the modified controlling mechanism, taken on the plane represented by the line 6—6 in Fig. 5; and, Fig. 7 is a schematic diagram of the electrical circuit for energizing and controlling the driving motor of the milling machine.

Figure 1:
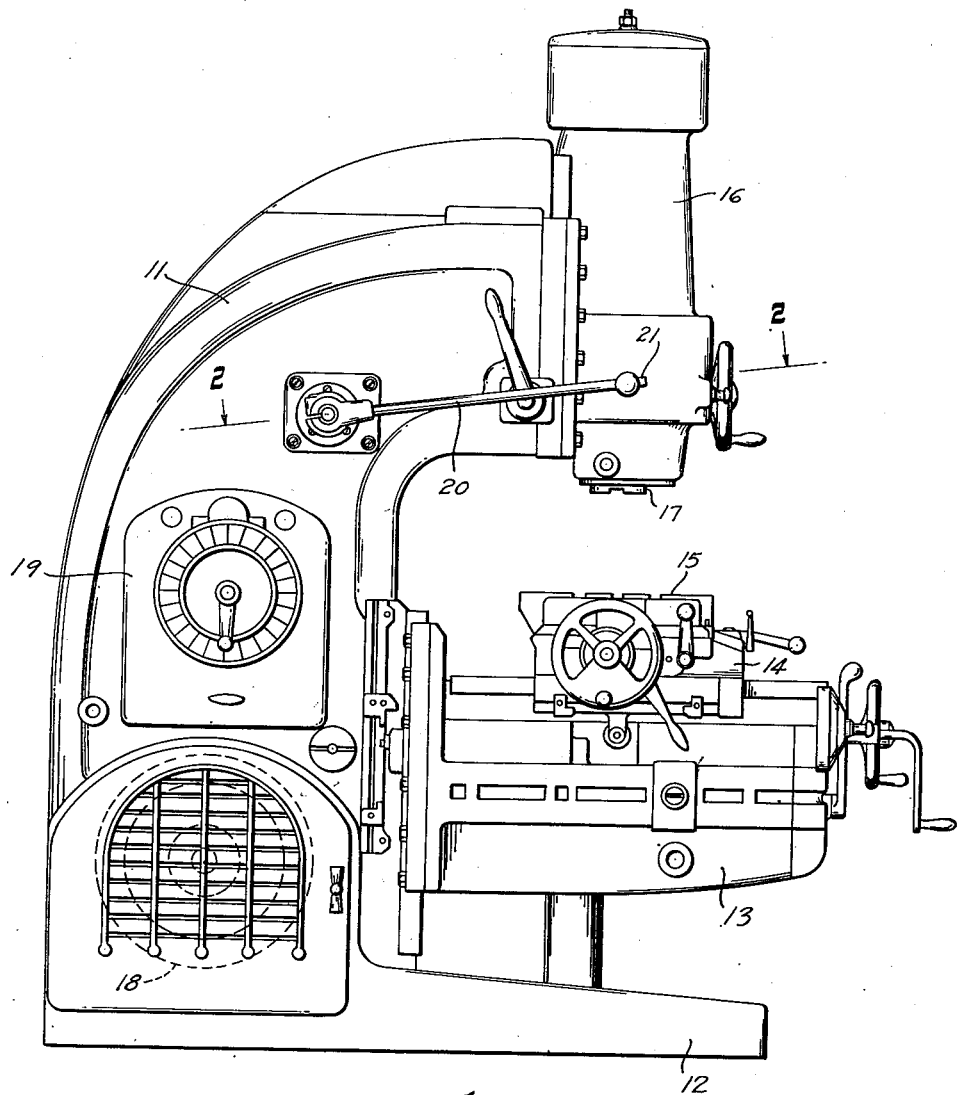
Figure 1 is a view in side elevation of a milling machine of the vertical spindle type, equipped with controlling mechanism embodying the present invention.

Referring more specifically to the drawings and particularly to Fig. 1 thereof, the milling machine to which the invention is here applied, may be of the knee and column type, such as the machine described and shown in its entirety in copending application Serial No. 519,366, filed January 22, 1944, now Patent No. 2,497,842, dated February 14, 1950, although it is to be understood that this embodiment of the invention is intended to be illustrative only and that its novel features may be incorporated in other machines with equal advantage.

The machine shown comprises essentially an upright column 11 formed integrally with a forwardly extending base 12, to constitute a supporting frame structure for the cooperating work supporting and tool supporting members of the machine.

The work supporting members of the machine include the usual knee structure 13 slidably mounted on the front face of the column 11 for vertical adjustment, and that carries upon its top surface a saddle structure 14 slidably mounted thereon for transverse movement toward or from the column. The saddle structure 14, in turn, carries a work supporting table 15, that is slidably mounted thereon for horizontal longitudinal movement.

A vertically movable head 16 is slidably mounted on the front upper face of the column 11 and carries the tool supporting member, constituted by a vertically disposed spindle 17 journalled therein and with its tool receiving end extending downward in cooperating relationship with the table 15.

Power for driving the rotatably mounted cutter spindle 17 is derived from an electric motor 18, mounted in the base of the column as shown in Fig. 1, and connected to drive a main pulley (not shown) by means of multiple belts as explained in the afore-mentioned copending application, the power then being transmitted through a speed changing transmission 19 to drive the spindle 17.

The particular controlling mechanism exemplifying this invention, comprises a lever 20 pivotally mounted on the side of the column 11, and carrying an axially slidable push button 21 that is contained within the outer end of the lever, in combination with a plurality of associated electric switching means. The electric switching means are mounted within the column 11 in operative relationship with both lever 20 and push button 21, and are directly actuatable by movements of the lever or the push button. The lever 20 is maintained in a horizontal neutral position which is midway between the extreme limits of an operating arc delimiting the allowable pivotal movement. A movement of lever 20 in one direction from the neutral position causes actuation of one switch to energize the motor for starting the machine. A movement of the lever in the opposite direction from the neutral position causes actuation of another switch for deenergizing and stopping the machine motor. The double acting switch for stopping the motor operates first to de-energize the motor on initial movement of the lever and, secondly, on a further movement of the lever in the same direction, to apply an electrical braking action to stop the motor instantaneously. After pivoting the lever in either direction to start or stop the machine motor, the aforementioned resilient means will effectuate its return to the neutral position from which further controlling movements may be initiated as desired.

In order to facilitate the shifting of gears in the spindle transmission 19, the main spindle driving motor may be energized momentarily by depressing the slidably mounted push button 21 located in the outer end of lever 20. A time limiting relay is provided in the electrical control circuit to prevent continued motor rotation in the event the push button 21 is held in the depressed position. By means of the switching means and associated control circuits, the single control lever 20 with its self-contained push button 21, affords a unitary controlling means to obtain a plurality of motor movements. For operational convenience, the lever 20 is removably mounted on a pivotal shaft to allow repositioning in any of an infinite number of angularly related operating locations.

The starting lever and switching means shown in the drawings, are particularly appropriate to control the several electric motors of a milling machine arranged for independent or coordinated operation, similarly to those contained in the milling machine described in the afore-mentioned patent. However, the operative details of the electrical controlling mechanism herein described, are equally well illustrated by the simplified electrical circuit, shown in Fig. 7, which may be used to advantage in controlling the single main drive motor of the milling machine shown in Fig. 1. The circuit is shown in coordinated relationship with controlling micro switches and switch actuating elements, which are directly responsive to selective manipulation of the pivotal starting lever 20 or the slidable push button 21.

Figure 7:
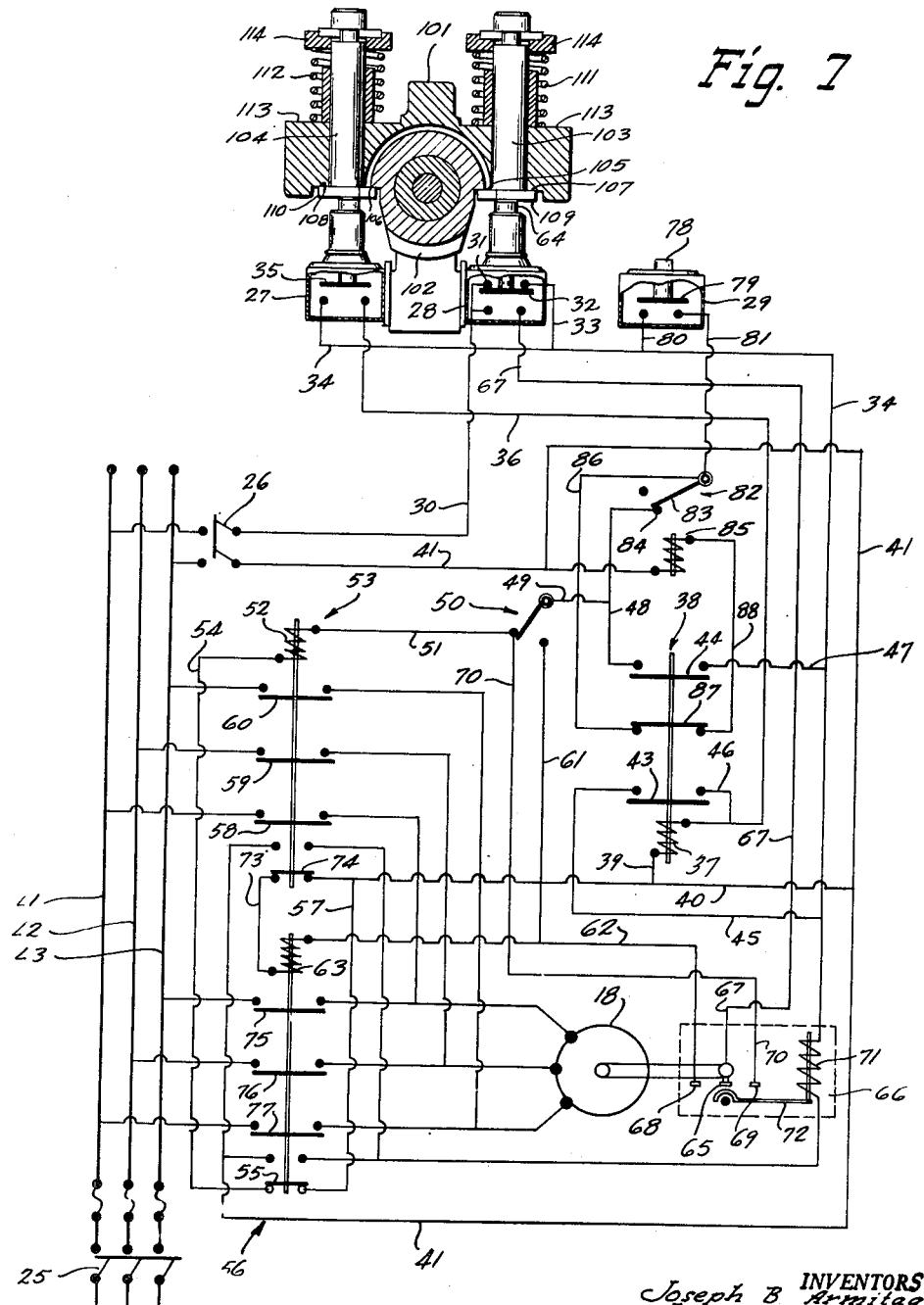

Electrical energy for operating the spindle motor 18 and the various control relays is derived from line conductors $L_1$, $L_2$ and $L_3$, as indicated in Fig. 7, the line conductors being connected to a source of power by means of a disconnecting switch 25 in the usual manner. In order to operate the motor 18, or any of the control elements, it is necessary to energize a control circuit that is represented by light lines in the drawing. Power for the control circuit is obtained from conductors $L_1$ and $L_2$, through a disconnecting switch 26. With the control circuit energized by closure of the disconnecting switch 26, three micro switches for starting, stopping and inching may be selectively actuated to control the main drive motor. The three switches comprise a starting switch 27, a stop switch 28, and an inching switch 29, since they are operative to secure the respectively named functions of the main drive motor.

With the stop switch 28 closed, as is shown in Fig. 7, a control circuit for starting the spindle motor is established from the energized control conductor 30 to one terminal 31 of the normally closed stop switch 28, through the contact plate 32, and to conductors 33 and 34 connecting with one terminal of the starting switch 27. Actuation of the starting switch 27 causes closure of the contact plate 35, allowing a continued current flow from the energized conductor 34, to conductor 36 connecting with one terminal of a solenoid coil 37, of a master starting relay 38. Current flowing through the solenoid 37 effects its energization resulting in movement of the relay 38 upward to a closed position, with a return circuit from the coil being completed through conductors 39 and 40, connecting with the energized return line 41 to the switch 25.

Movement of the relay 38 to a closed position causes the two contact bars 43 and 44 within the relay to be moved upward to a closed position, whereby pairs of contact terminals associated with each are bridged to simultaneously establish a holding circuit for retaining the relay 38 in closed position and a starting circuit for energizing the main drive motor 18. The holding circuit is completed on closure of contact bar 43, allowing a current flow from the energized conductor 34 and a conductor 45 through a conductor 46 to the solenoid coil 37.

The circuit for energizing the main drive motor 18 is established on closure of contact bar 44, allowing a current flow from the energized conductor 34, through a conductor 47, contact bar 44, a conductor 48, and a conductor 49, leading to one terminal of a reversing switch 50. With the reversing switch 50 positioned as shown in Fig. 7, the current will flow from conductor 49 through the switch to a conductor 51, connecting with one terminal of a solenoidal coil 52 of a forward motor starting switch 53. Energization of the solenoid 52 effects a movement of the forward motor switch 53 to a closed position. A current flow for a return circuit is established through a conductor 54. From conductor 54, the return circuit is completed through a closed contact element 55 of reversing spindle motor switch 56, conductors 57 and 40 connecting with the energized return line 41. Energization of the solenoid 52 effects a movement of the forward spindle motor switch 53 to a closed position, effecting a closure of the contact bars 58, 59 and 60, whereby pairs of contacts respectively associated with each are bridged to allow a current flow directly from the line conductors $L_1$, $L_2$ and $L_3$ to the motor 18. Thus, the motor 18 will be energized for clockwise or forward rotation.

The reversing switch 50 is selectively positionable to form a connection from the conductor 49 to either the conductor 51 or a conductor 61. As has been mentioned, the conductor 51 is connected directly to the solenoid 52 of the forward motor starting switch 53. The conductor 61 is connected through a conductor 62 to a solenoid 63 of the reversing spindle motor switch 56. The reversing switch 50 therefore acts as a selector to predetermine the desired motor rotation before the master starting relay 38 has been moved to a closed position by energization of the solenoid 37 as initially induced by manipulation of the starting switch 27 to a momentarily closed position, as already mentioned.

With the motor 18 energized for rotation in either direction, actuating the stop switch 28 performs the dual function of first, de-energizing the motor 18 and secondly, establishing a circuit for applying an electrical braking mechanism to instantaneously stop the motor. Initial downward movement of a reversing switch actuating button 64 causes a movement of the contact element 32 in the stop switch 28 away from its normally closed position, thus preventing a current flow from the energized line 30 to conductor 33 connecting with the relay 38. This current interruption breaks the current flow to the solenoid 37, allowing its de-energization and resultant dropping of the master starting relay 38 to an open position with a concomitant movement of contact elements 43 and 44 out of engagement with the pairs of contacts associated with each. With the contact bar 43 in open or disengaged position, the holding circuit which had been previously established to effect continued energization of the solenoid coil 37 is broken. With the contact bar 44 in open or disengaged position, the current flow from the energized conductor 34, through branch conductors 47, 48 and 49 and reversing switch 50, to either conductors 51 or 61, is also interrupted. Thus, since conductor 51 leads directly to the solenoid 52 of the forward motor switch 53, and since conductor 51 leads to solenoid 63 of the reversing switch 56, the current interruption will result in a de-energization of whichever solenoid (either 52 or 63) had been energized, permitting the motor switch to open and interrupt the current flow to the motor 18.

After the motor has been de-energized, a further movement of the actuating button 64 operates to effect an electrical braking action on the motor to stop rotation almost instantaneously. This braking action is accomplished in this instance through a momentary energization of the motor in a reversed direction of rotation under the control of a plugging switch 66 on the motor shaft. Closure of the contact element 32 across the lower set of terminals in the stop switch 28, by depressing the actuating button 64 to its extreme limit of movement, causes a current flow from the energized conductor 30 to a conductor 67 connecting directly with the movable element 65 of the plugging switch 66.

Whenever the motor is energized for rotation in either clockwise or counterclockwise direction, the rotating motor shaft actuates the movable plugging switch element 65 through a torque action, bringing it into engagement with either of a pair of cooperating stationary contact elements 68 or 69. The reversing switch solenoid 63 is connected by a conductor 62 to the stationary plugging switch contact 68, and the forward motor switch solenoid 52 is connected by conductors 51 and 70 to the other stationary plugging switch contact 69.

Assuming that the motor 18 has been energized for forward or clockwise rotation by closing the switch 53, the starting relay 38 will then be in closed position and a plugging switch coil 71 will be energized through the starting switch 27 and conductor 34 to move a safety latch 72 into disengaged position, allowing free pivotal movement of the plugging switch element 65. Clockwise rotation of the motor 18 will then cause the unlatched movable plugging switch element 65 to be engaged with the stationary contact 86, which is connected through conductor 62 to the reversing motor switch solenoid 63.

With the control circuit elements positioned as described, initial movement of the actuating button 64 will effect movement of the master relay 38 and the forward motor switch 53 to an open position and effect a de-energization of the motor 18. A further movement of the actuating button 64 will cause movement of contact element 32 into engagement with a pair of associated contacts, whereby current will flow from energized conductor 30 to conductor 67, connecting with the movable plugging switch element 65. Since the movable element 65 is still in engagement with the stationary contact 68 under influence of the forwardly rotating motor, current flow will continue through the conductor 62 to energize the solenoid 63 and cause movement of the reversing motor switch 56 to a closed position. The return circuit from the solenoid 63 is completed through a conductor 73, a contact element 74 of the open forward motor switch 53, and then through conductor 40 connecting with the energized return line 41. With the solenoid 63 energized and the reverse motor switch 56 in a closed position, the contact bars 75, 76 and 77 are positioned to allow a current flow directly from line conductors L₁, L₂ and L₃ to the spindle motor 18, effecting its energization in a reverse or counterclockwise direction. As previously indicated, the circuit established by holding the switch actuating button 64 in a depressed position, is dependent upon the movable plugging switch element 65 being retained in engagement with the stationary contact 68. Since only the forwardly rotating motor actuates the element 65 into closed position with contact 68, element 65 will drop back into its neutral position as soon as forward motor rotation has been completely stopped. Although in effect, depressing button 64 energizes solenoid 63 to cause rotation of the motor 18 in a reverse or counterclockwise direction, a complete reversal is not effected, because as soon as the forwardly rotating motor is decelerated sufficiently to stop forward rotation, the movable plugging switch element 65 will drop out of engagement with the stationary contact 68, returning to a neutral latched position. The current flow to the solenoid coil 63 will thus be interrupted to effect the opening of the reverse motor switch 56 resulting in de-energization of the motor 18. With both motor switches in an open position, the plugging switch coil 71 will be de-energized and the safety arm 72 released to drop into a latched position over the movable plugging switch element 65, preventing its engagement with either of the associated stationary contacts 68 and 69 in event the motor is manually rotated.

The motor may also be energized momentarily for facilitating the shifting of gears in the speed transmission mechanism 19 by depressing an actuating button 78 of the inching switch 29. Depressing button 78 operates to move a contact bar 79 into a closed position, allowing a current flow from the energized conductor 34 through a conductor 80 and the contact element 79 to a conductor 81, connecting with a timing relay 82. The current flow continues through a normally closed relay element 83 to a terminal contact 84 of the timing relay 82. Current flow from the relay contact 84 continues through conductors 48 and 49, reversing switch element 50 and conductor 51 to energize the solenoidal coil 52 of the spindle motor switch 53. Energization of the coil 52 causes upward movement of the switch 53 to a closed position, wherein the switch contact bars 58, 59 and 60 are closed to bridge pairs of contacts respectively associated with each, permitting a current flow directly from line conductors L₁, L₂ and L₃ to energize the motor 18. Since the direction of rotation is immaterial in effecting the shifting of gears in the speed transmission, the reversing switch 50 may be positioned to direct current either through conductor 51 to actuate the forward motor starting switch 53, or through conductors 61 and 62 to actuate the reverse motor starting switch 56. To allow only a momentary energization of the spindle motor, a timing relay coil 85, energized simultaneously with the spindle motor 18, operates automatically after a predetermined time interval to move the relay element 83 out of engagement with the terminal contact 84. Movement of the relay element 83 to a disengaged position interrupts the current flow to de-energize the forward motor switch coil 52, allowing it to drop to an open position, and, consequently, results in the de-energization of the motor 18. Energization of the timing coil 85 is effected by a circuit leading from energized conductor 81, through a conductor 86, a normally closed contact bar 87, in the master relay 38, to a conductor 88 connecting with the timing coil 85. The return circuit is completed by a direct connection of the coil 85 with the energized line 41. The timing relay is arranged to be operated only when the master starting relay 38 is in open position and the main drive motor 18 has not been energized for normal continuous operation. In order to obtain this result, the contact element 87 of the relay 38 is arranged to bridge its associated contacts and form a connection between conductor 86 and 88 only when the relay 38 is in its open position.

As has been indicated, actuation of the micro switches 27, 28 and 29 to effect movement of the various elements in the electrical circuit to control the motor 18, is accomplished by manipulation of the single starting lever 20 or its self-contained push button 21. Referring to the embodiment of the invention shown in Figs. 2 and 3, the starting lever 20 is removably mounted on the outer end of a hollow shaft 100 which is rotatably journalled in a mounting bracket 101. In addition to the shaft 100, the mounting bracket 101 also carries other associated controlling elements and is unitarily removable from the milling machine column. A cam 102 is keyed to the inner end of the shaft 100 so that pivotal movement of the lever 20 will impart a similar pivotal movement to the cam 102. However, complete rotation of the shaft 100, with its attached lever 20 and cam 102, is prevented by resilient means, serving both to restrict the movement of these members to a limited arc of operating movement, as well as to maintain them in a neutral position midway between the extreme limits of the operating arc.

The resilient means include two plungers 103 and 104, parallelly mounted in the bracket 101 for axially slidable movement transversely to the shaft 100. Each of the plungers 103 and 104 is arranged for axially slidable movement, and each is urged rightwardly against positive stops located in the same plane. The shaft 100 and the cam 102 affixed thereon, are so disposed that when in neutral position a plane passing through parallel cam faces 105 and 106 coincides with a plane passing through positive bracket stops 107 and 108. The rear faces of plunger shoulders 109 and 110 are retained in a parallel plane by being resiliently urged rightwardly against the positive bracket stops 107 and 108, respectively, through the action of compression springs 111 and 112 exerting pressure between the rear bracket face 113 and plunger collar 114. In their rightwardly urged position, the rear plunger shoulders 109 and 110 are in simultaneous abutting engagement with the cam faces 105 and 106, as well as with the positve bracket stops 107 and 108. The plungers 103 and 104, therefore, provide a resilient means for retaining the cam 102 in a neutral position, and also tend to urge the cam back to its neutral position in the event it has been momentarily rotated in either direction. The starting switch 27 and the stop switch 28 are mounted in the bracket 101, so that the actuating button of each is axially parallel with and abuts the end of one of the outwardly slidable plungers 104 and 103, respectively. Thus, an outward movement of the plunger 103 will depress the actuating button of switch 28 and in a similar manner, outward movement of plunger 104 will depress the actuating button of switch 27. Since the plunger shoulders 109 and 110 are in engagement with the cam faces 105 and 106, rotating cam 102 in either direction from its neutral position will induce proper plunger movement to depress the desired switch actuating button.

Figure 2:
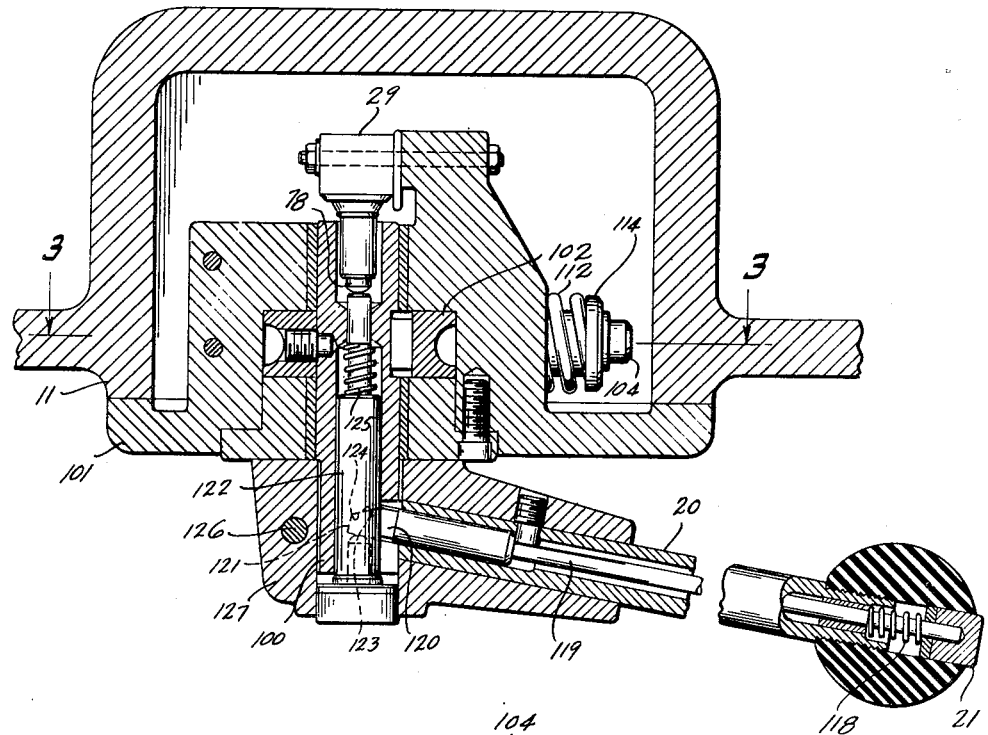
Fig. 2 is an enlarged view in horizontal transverse section through the controlling mechanism, taken on the plane represented by the line 2—2 in Fig. 1.
Figure 3:
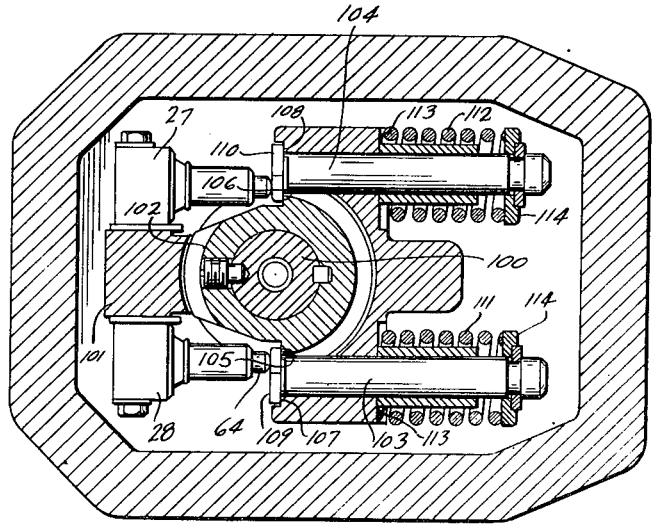
Fig. 3 is a view in vertical transverse section through the controlling mechanism, taken on the plane represented by the line 3—3 in Fig. 2.

Referring to Figs. 2, 3 and 7, the machine motor 18 may be energized for continuous operation by moving lever 20 upwardly from its neutral position. Upward lever movement will cause a counterclockwise rotation of shaft 100 and a like movement of cam 102 to move the plunger 104 outward. The outward movement of plunger 104 will depress the actuating button of switch 27 to energize the machine motor 18, and on releasing the lever 20, the resilient action of plunger 104 will effect the return of cam 102, shaft 100 and lever 20 to their respective neutral positions.

In a similar manner, the downward pivotal movement of lever 20 will effect a clockwise rotation of shaft 100 and cam 102 to move plunger 103 axially outwardly for depressing the actuating button 64 to de-energize the motor 18. The lever again is returned to its neutral position by the resilient action of plunger 103 on cam 102 when the lever is released.

The inching action for starting the motor 18 momentarily to facilitate the adjustment of the spindle transmission is obtained by manually depressing the slidable push button 21, mounted in the outer end of lever 20. The push button 21 is resiliently returnable to its inactive position, in a well known manner, by the action of compression spring 118. Depressing push button 21 operates directly to move a rod 119, which is non-turnably contained for axially slidable movement within the shaft of lever 20. Rod 119 is provided with a tongue 120, arranged to engage a slot 121 within a transversely located plunger rod 122 slidably mounted within the hollow shaft 100. The bottom portion of the rod tongue 120 is provided with an angular cam face 123, which engages a complementary cam face 124 formed in the bottom portion of the slot 121. Since the rod 122 is axially slidable within the hollow shaft 100, an inward movement of the rod 119 will transmit a similar inward movement to the transverse rod 122 by the sliding action between the cam faces 123 and 124. The inward movement of rod 122 in turn will operate directly to depress the actuating button 78 of micro switch 29 to effect a momentary energization of the motor 18, as previously explained. On releasing push button 21, a spring 125 will effect outward movement of the rod 122 to its inactive position.

Since the tongue 120 is arranged for a sliding fit into the slot 121 of the rod 122, the latter will turn with the shaft 100 whenever the lever 20 is pivoted from its neutral position. This insures a continuing engagement between the complementary cam faces 123 and 124.

As previously indicated, the shaft 100 is maintained in an inactive neutral position through the resilient action of plungers 103 and 104 on the cam 102, which is keyed to the shaft 100. The lever 20 being removably mounted on the shaft 100, is likewise retained in the inactive neutral position. The neutral position of the lever 20 is the starting point from which all of the pivotally operable movements of the lever and the slidable movement of its self-contained push button 21 are made. For operational convenience, the angular location of this inactive neutral position of the lever 20 may be infinitely varied about the shaft 100 as an axis. Repositioning of lever 20 is effected by loosening a clamping screw 126 to loosen the clamping pressure exerted by a slotted hub 127 of the lever 20 on the shaft 100. It is then possible to rotate lever 20 to any desired operational position on shaft 100 and reclamp it thereon by again tightening the screw 126 in a well known manner.

While a particular embodiment of the invention herein described and illustrated in Figs. 1, 2 and 3, is primarily intended for application to a machine so that the starting lever 20 is pivotally rotatable through a vertical plane, it may with equal facility be mounted on a machine in such manner that the lever 20 is pivotal through any other convenient plane. The design and construction of the mounting bracket 101 with the associated control elements including lever 20 and the switching means, comprises an integrally formed controlling mechanism which may be removably installed on a milling machine in any convenient operating position.

A modified form of the invention is illustrated in Figs. 4, 5 and 6, incorporated in a milling machine of the horizontal spindle, knee and column type. Referring to Fig. 4, showing the upper portion of a column structure 130, a horizontally mounted pivotal starting lever 131, having an enlarged housing structure 132 containing associated switching means at its inner end, is journalled upon the top of the column structure 130. In general operation, the lever 131 is similar to the lever 20 shown in Fig. 1, in that the lever 131 also may be pivoted through a limited arc of operating movement. Resilient means are also provided to retain the lever 131 in a neutral position midway between the extreme limits of its operating arc. Movement of the lever in one direction from its neutral position serves to energize the main drive motor for starting the machine, while movement of the lever in the opposite direction is effective to first, de-energize the machine motor and secondly, on a further movement in the same direction to actuate the electrical braking mechanism for stopping the motor instantly. An inching control button 133, mounted on the box like structure 132 is actuatable to energize the motor momentarily for facilitating spindle transmission adjustment.

Referring to Figs. 5 and 6, a hollow shaft 134 is secured to the housing 132 of lever 131 to form a conduit through which are passed wires (not shown) connecting the micro switches 27, 28 and 29 into the machine circuit. The shaft 134 extends through the cam 102 which is journalled within the housing 132. A socket 135 contained in the machine column 130 is adapted to receive the cam 102 and retain it in a non-rotating stationary position by virtue of radially spaced clutch teeth 136 integrally formed on the cam 102 meshing with complementary clutch teeth interiorly formed in the socket 135. With the cam 102 in position in the socket 135 and the clutch teeth 136 engaged with the complementary socket clutch teeth, the cam 102 itself forms a non-rotating journal about which the lever 121 may be pivoted.

Referring to Fig. 6 showing the modified form of the invention, and to Fig. 3 showing the principal form of the invention, it is readily apparent that in the former the cam 102 is not rotatable while in the latter shaft 100 and the corresponding cam 102 are rotatable. Also, in the modified form shown in Figs. 5 and 6, the lever 131 is rotatably journalled on the cam 102; and in the principal form shown in Figs. 2 and 3, the lever 118 is fixedly mounted on the shaft 100 which in turn is keyed to the corresponding cam 92. Plungers 103 and 104 shown in Fig. 3 are mounted for axially slidable movement in the stationary mounting bracket 101 and are leftwardly movable selectively as the cam 102 is rotated in a clockwise or counter-clockwise direction. On the other hand, the corresponding plungers 103 and 104 shown in the modified form in Fig. 6 are slidably mounted in the rotatable housing 132 and are leftwardly movable when the housing 132 is rotated about the fixedly mounted cam 102 as will hereinafter be described in greater detail.

Plungers 103 and 104, provided with enlarged shoulders 109 and 110 integrally formed on their leftward ends, are slidably mounted within parallelly spaced bores formed within the housing structure 132 of lever 131. Plungers 103 and 104 are resiliently urged rightwardly by compression springs 111 and 112 so that the rear faces of plunger shoulders 109 and 110, respectively, are maintained in engagement with positive stops 107 and 108. Since the cam faces 105 and 106 lie in an imaginary plane extending through positive stops 107 and 108, they are also in engagement with the rearward faces of plunger shoulders 109 and 110. The starting switch 27 and stop switch 28 are fixedly mounted in parallel spaced relationship within the housing 132 so that the respective switch actuating plungers are positioned axially parallel to and in abutting relationship with the slidable plungers 103 and 104.

Since the cam 102 is retained in a non-turnable position, the starting lever 131 and its integrally formed housing 132 may be pivoted thereabout in either a leftward or rightward direction. Pivoting lever 131 rightwardly will effect an outward movement of plunger 103 by virtue of the shoulder 109 engaging cam face 105 of the non-rotating cam 102. Outward movement of plunger 103 operates to depress the actuating button of the starting switch 27, thereby effecting an energization of the main drive motor 18. Releasing the lever 131 will permit its return to the radially neutral starting position under the resilient action of plunger shoulder 109 exerting pressure against the stationary cam face 105.

In a similar manner, pivoting the lever 131 leftward from its radially neutral position will induce an outward movement of plunger 104 to depress the actuating button of stop switch 28 to de-energize the motor 18 and apply a braking action for quick stopping. As heretofore mentioned, the leftward movement of lever 131 is selective in that it may be released after the spindle motor 18 has been de-energized to permit both the motor 18 and the spindle (not shown) to coast to a stop. Additional leftward movement of the lever 131 to again actuate the double acting stop switch 18 for applying the electrical braking action to stop the motor instantly, may be made at any time before the spindle has stopped rotating, or can be made immediately after the spindle motor 18 has been de-energized as one continuing leftward movement to stop the spindle instantly.

It will be noted that the slidable plungers 103 and 104 perform the functions of selectively actuating either the starting switch 27 or the stopping switch 28, of maintaining the lever 131 and the integrally formed housing 132 in a radially neutral position with respect to the cam 102, and of limiting the pivotal movement of lever 131 in either leftward or rightward direction.

To energize the main drive motor 18 momentarily for facilitating spindle transmission adjustment, an inching button 133 is mounted directly on the housing 132. Depressing button 133 operates directly to actuate the inching switch 29, which in turn functions through the circuit control elements previously described, to energize motor 18 for a momentary, timed rotation.

From the foregoing description and explanation of the controlling mechanism herein set forth as exemplifying the invention, it is apparent that there has been provided an improved control system combining the advantages and convenience of a manually operable single control lever with the advantages of direct acting electrical switches to most effectively and conveniently operate the electric motors of a machine tool. Both of the principal and the modified forms of the invention provide mechanical actuating means in combination with a plurality of electrical switching means, coordinated with an electrical control circuit to obtain the desired selective motor control.

Although the illustrative embodiments of the invention have been described in considerable detail for the purpose of setting forth practical exemplifying apparatus, it is to be understood that the particular structures and control systems herein described are intended to be illustrative only and that the various inventive features may be incorporated in other structural forms without departing from the spirit and scope of the invention as defined in the subjoined claims.

We claim:

1. In a machine tool, a frame, a change gear transmission mechanism carried by said frame, an electric motor operatively connected to drive said transmission mechanism, a control lever for said motor pivotally mounted on said frame, a control switch disposed to be actuated by said lever upon movement thereof in one direction from a neutral position, and connected to energize said motor when actuated, another control switch disposed to be actuated by said lever upon movement thereof in another direction from neutral position and connected to deenergize said motor upon initial actuation and upon further movement to reverse the flow of current to said motor to effect a braking action, a push button carried by said lever, and an inching control switch disposed to be actuated by said push button and connected to energize said motor when actuated to turn said transmission mechanism for facilitating gear changing, and a timing relay connected to said inching switch and connected to deenergize said motor a predetermined time interval after said inching swich is actuated to prevent overspeeding said transmission mechanism during gear changing.

2. In a milling machine, a column, a spindle rotably journalled in said column, an electric motor in said column connected to drive said spindle, an electrical braking mechanism arranged to effect a selectively regulated stopping of said motor, an adjustably positionable lever mounted on said column and arranged to control said electric motor, two switches mounted in said lever and operable by a pivotal movement thereof, one of said switches connected to start said motor, the other of said switches connected to stop said motor by first deenergizing said motor and on continued movement by energizing said electrical braking mechanism to effect a relatively instantaneous stopping of said motor, a cam shaft journalled in said lever in position to operate either of said switches selectively, resilient means arranged to urge said lever to a relatively constant angularly adjusted position with respect to said cam shaft and a mounting bracket on said column; said cam shaft positionable on said mounting bracket in any of several angularly adjusted positions, said lever pivotally movable in one direction from its neutral position to start said motor, and said lever pivotally movable in the opposite direction to stop said motor.

3. In a machine tool controlling mechanism, a manually operable lever, a starting switch and a stop switch, a cam having its inner end removably affixed to said machine, said lever rotatable about said cam in an operating arc of limited movement to actuate either of said switches selectively, resilient means urging said lever to a position angularly neutral to its operating arc and means for positioning said cam in any preselected angularly adjusted non-turnable location with respect to said machine.

4. In a machine tool, an electric motor, manually operable means for controlling said motor comprising a plurality of separate circuit control means mounted in said machine, a shaft pivotally journalled in said machine in a resiliently urged neutral position, cam surfaces on said shaft arranged to operate two of said circuit control means individually for stopping said electric motor or for starting said electric motor for continuous operation, a starting lever removably mounted on said shaft for selectively variable angular positioning thereon, a push button slidably mounted in said lever, and linkage contained within said lever and said shaft forming an operative connection between said push button and the third of said circuit control means, whereby said push button may be selectively operated for the momentary starting of said motor for controlled intermittent operation.

5. In a machine tool, an electric motor, switches connected to control said motor, a shaft removably affixed to said machine and a lever pivotally mounted on said shaft for manual control of said switches, said shaft being arranged for angular adjustment and having diametrically opposed laterally extending abutment faces on its upper end, two resiliently urged plungers slidably mounted in said lever, disposed to coact with said abutment faces whereby balanced resilient means are provided to urge said lever to a substantially constant angularly located position with respect to said shaft, two of said switches being connected for starting or stopping said motor respectively and being selectively actuatable by pivotal movement of said lever, and another of said switches being disposed for direct manual actuation and connected to start said motor momentarily when actuated for intermittent operation.

6. In a machine tool, a frame, a change gear transmission mechanism carried by said frame, an electric motor operatively connected to drive said transmission mechanism, a control lever for said motor pivotally mounted on said frame, a control switch disposed to be actuated by said lever upon movement thereof in one direction from a neutral position and connected to energize said motor, and another control switch disposed to be actuated by said lever upon movement thereof in another direction from neutral position and connected to first deenergize said motor and upon further movement to reverse the flow of current to said motor to effect a braking action.

7. In a milling machine, a column, a spindle rotatably journalled in said column, a variable speed transmission, an electric motor arranged to drive said spindle through said variable speed transmission, circuit control means connected to selectively control the operation of said motor, a starting lever pivotally mounted on said machine, a cam shaft journalled in said machine for limited pivotal movement and forming the pivotal mounting for said lever, equalized resilient means operative on said cam shaft to urge said shaft to a neutral position midway between its limits of movement, said cam shaft operative on said circuit control means for starting or stopping said electric motor as said lever is selectively moved from its neutral position, and push button means for direct selective actuation of said circuit control means to energize said motor momentarily for intermittent operation.

8. In a machine tool, a source of power and means for controlling said source of power at an infinite number of operating positions and comprising an angularly positionable pivotal shaft removably mounted on said machine, a starting lever movably affixed to said pivotal shaft for restricted angular movement thereabout, resilient means for urging said lever to a neutral position between its limits of angular movement on said shaft, two switches secured to said lever and movable therewith in angular relationship to said pivotal shaft, a cam surface presented by said pivotal shaft and arranged to operate one of said switches selectively as said lever is moved in a corresponding direction from its neutral position, said switches being connected to start or stop said power source, a third switch connected to start said power source momentarily, and switch actuating means contained in said lever whereby said third switch may be controlled for independent operation.

9. In a milling machine, an electric motor, a starting lever pivotally movable through a limited operating arc, a pivotal mounting shaft for said lever being rotatably positionable to provide an infinitely selective variation in the angular position of said starting lever, resilient means arranged to urge said starting lever to a substantially neutral position with respect to its allowable arc of pivotable movement and, two switches mounted in said starting lever, one of said switches being arranged to operate as said starting lever is moved in one direction from said neutral position, and the other of said switches being arranged to operate as said lever is moved in the opposite direction from said neutral position, said two switches being connected to start or stop said electric motor selectively.

10. In a machine tool, a frame, a change gear transmission mechanism carried by said frame, an electric motor operatively connected to drive said transmission mechanism, a control lever for said motor pivotally mounted on said frame, a control switch disposed to be actuated by said lever upon movement thereof in one direction from a neutral position and connected to energize said motor when actuated, another control switch disposed to be actuated by said lever upon movement thereof in another direction from neutral position and connected upon initial movement to first deenergize said motor when actuated and upon further movement to reverse its electrical connections and thereby effect a braking action, a push button carried by said lever, and an inching control switch disposed to be actuated by said push button and connected to energize said motor when actuated to turn said transmission mechanism for facilitating gear changing.

11. In a machine tool; an electric motor; and controlling means selectively operable to start said motor for continuous operation, to stop said motor when so operating or to start said motor momentarily for intermittent operation; said controlling means comprising a shaft pivotally journalled in said machine, two plungers slidably mounted in said machine and arranged for axial sliding movement, resilient means provided to urge said plungers to an inactive position, two switches arranged to be individually operated by movement of said plungers, said plungers arranged to urge said shaft to a neutral inactive position, said shaft turnable in either direction to selectively move one of said plungers in opposition to said resilient means, a lever removably mounted on said shaft whereby said shaft may be selectively turned, a push button slidably mounted in said lever, a third switch mounted in said machine, linkage located within said lever and said shaft forming an operative connection between said push button and said switch whereby three distinct electric switching actions in said machine are obtainable by selective manipulation of said lever.

12. In a machine tool, a frame, an electric motor carried by said frame, a control lever pivotally mounted on said frame, a switch connected to energize said motor when actuated, a second switch connected to first deenergize said motor when actuated and upon further movement to reverse the flow of current to it until a braking action is effected, a third switch connected to momentarily energize said motor when actuated, said switches being movable with said lever, an abutment fixed on said frame in such position as to be engaged by said switch when said lever is moved in a predetermined direction to actuate said first switch and to be engaged by said second switch when said lever is moved in the opposite direction to actuate said second switch, and a push button mounted on said lever and operative when depressed to actuate said third switch.

13. In a milling machine, a rotatable spindle, an electric motor connectible to drive said spindle, circuit control means connected to energize or deenergize said motor, secondary circuit control means connected to energize said motor for intermittent operation, a cam shaft journalled in said machine, resilient means urging said cam shaft to an inactive neutral position, a starting lever removably mounted on said cam shaft for selectively angular positioning thereon, said lever movable in one direction to rotate said cam shaft from its resiliently urged neutral position whereby said circuit control means are actuated to energize said motor, said lever movable in the opposite direction to actuate said circuit control means to deenergize said motor, a push button mounted in said lever for axially slidable movement and linkage contained in said lever and said cam shaft providing an operative connection between said secondary circuit control means and said push button, whereby said secondary circuit control means may be selectively actuated to effect momentary energization of said motor for intermittent operation.

14. In a machine tool, a column, a source of power, a rotatable spindle connected to be driven by said source of power, a non-rotatable angularly adjustable shaft removably mounted on said column, a starting lever pivotally mounted on said shaft, resilient means arranged to restrict the pivotal movement of said lever and urge it to a central position, two switches mounted in said lever individually connected to start or to stop said source of power respectively, said switches being arranged for selective actuation as said starting lever is pivoted from its neutral position and a third switch mounted in said lever connectible to start said motor momentarily for intermittent operation.

15. In a machine tool having a motor driven change gear mechanism, a motor controlling switching mechanism including a pivotally mounted control lever, resilient means arranged to bias said lever toward a central neutral position, a motor starting switch disposed to be actuated to closed position when said lever is moved in a predetermined direction and connected to energize said motor when actuated, a motor plugging switch disposed to be actuated to closed position when said lever is moved in another direction and connected to stop said motor when actuated, a push button carried by said lever, and a motor jogging switch disposed to be actuated by said push button and connected to effect momentary energization of said motor when actuated to turn said mechanism for facilitating gear changing.

16. In a machine, a source of power, a pivotally journalled starting lever movable to start or stop said source of power, a stub shaft removably and non-turnably affixed to said machine forming a pivotal mounting for said lever, resilient means arranged to restrict the pivotal movement of said lever and urge it to a substantially neutral position with respect to the extreme limits of operating arc, two switches mounted in said lever, one of said switches being connected to energize said source of power and the other of said switches being connected to deenergize said source of power, a cam surface on said stub shaft arranged to actuate each of said switches selectively when said lever is moved in the respective direction from its resiliently urged neutral position, and said stub shaft adjustable for selectively positioning said lever in the most convenient operating position.

17. In a milling machine, a rotatable spindle, an electric motor connected to drive said spindle, switching means adapted to control said motor to selectively start or stop said spindle, a manually operable starting lever pivotally mounted on said machine to actuate said switching means, a cam shaft journalled in said lever forming a pivotal mounting therefor, radially spaced clutch teeth on the lower end of said lever, a mounting bracket on said machine having radially disposed interiorly located clutch teeth adapted to mesh with said clutch teeth on the lower end of said cam shaft, said lever arranged to be rotated about said cam shaft in a limited arc of movement, resilient means urging said lever to a position angularly neutral to its operating arc, said switching means mounted in said lever and actuatable by said cam shaft as said lever is moved from its neutral position, said lever being movable in one direction to start said motor and in the opposite direction to stop said motor, and said cam shaft being rotatably adjustable by means of said complementary clutch teeth whereby the operating position of said starting lever may be angularly adjusted.

18. In a milling machine; a rotatably journalled spindle; an electric motor connected to drive said spindle; three electric switches connected to control said motor; and manually operative controlling means for selectively actuating said switches to start said motor for momentary operation, to start said motor for continuous operation or to stop said motor when it is connected for continuous operation; said manually operable controlling means comprising a shaft journalled in said machine for restricted pivotal movement in either direction from a neutral position; resilient means arranged to urge said shaft to a neutral position; a starting lever removably mounted on said shaft for angular adjustment thereon; a push button slidably mounted in said lever; linkage contained in said lever and said shaft forming an operative connection between said push button and one of said switches; said push button being operable in any of the angularly adjusted positions of said lever to actuate said switch and thereby to start said motor for momentary operation; and cam surfaces on said shaft arranged to actuate either of the other two of said switches selectively as said lever is pivoted from its neutral position for starting or stopping said motor.

JOSEPH B. ARMITAGE.
JAMES N. FLANNERY.
JOHN B. LUKEY.

REFERENCES CITED

The following references are of record in the file of this patent:

UNITED STATES PATENTS

| Number | Name | Date |
|---|---|---|
| 1,231,264 | Kettering | June 26, 1917 |
| 1,484,048 | Zabel | Feb. 19, 1924 |
| 1,563,546 | Bouillon | Dec. 1, 1925 |
| 1,588,004 | Blood | June 8, 1926 |
| 1,705,515 | Benjamin | Mar. 19, 1929 |
| 1,709,619 | Johnson | Apr. 16, 1929 |
| 1,829,610 | Runner | Oct. 27, 1931 |
| 2,068,840 | Bennett | Jan. 26, 1937 |
| 2,144,735 | Granberg et al. | Jan. 24, 1939 |
| 2,191,137 | Trible | Feb. 20, 1940 |
| 2,271,745 | Peters | Feb. 3, 1942 |
| 2,331,695 | Johnson | Oct. 12, 1943 |
| 2,354,010 | Groene et al. | July 18, 1944 |
| 2,491,759 | Olcott | Dec. 20, 1949 |